June 26, 1923.
Re. 15,635
J. J. WILLIAMS
WIRE FRAME
Original Filed July 29, 1916
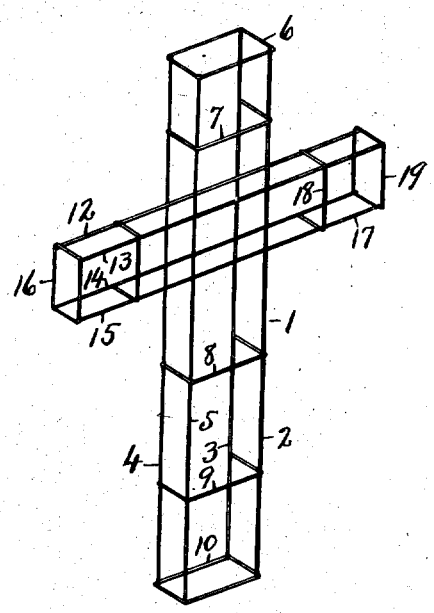
J. J. Williams
INVENTOR
By
Howard P. Denison
ATTORNEY Reissued June 26, 1923.

Re. 15,635

UNITED STATES PATENT OFFICE.

JESSE J. WILLIAMS, OF UTICA, NEW YORK.

WIRE FRAME.

Original No. 1,302,888, dated May 6, 1919, Serial No. 112,079, filed July 29, 1916. Application for reissue filed May 12, 1921. Serial No. 469,076.

*To all whom it may concern:*

Be it known that I, JESSE J. WILLIAMS, of Utica, county of Oneida, State of New York, have invented new and useful Improvements in Wire Frames, of which the following, taken in connection with the accompanying drawings, is a full, clear, and exact description.

This invention relates to wire frame structures, such, for instance, as are employed as the foundation for floral designs.

These frames or foundations are usually made up of a number of wires shaped to the desired design, and being connected together so as to form what is intended to be a rigid structure. The connections where one wire engages and intersects another, have heretofore been made by the use of separately formed tie-wires, said tie-wires simply spiraling along the main wires and about the intersecting portions. This manner of securing the main wires together is of course tedious and, at best, does not result in as substantial and rigid a structure as is desirable.

The object of the present invention, therefore, is to provide a frame wherein the main wires are secured together in immovable relation to each other, so as to form a rigid structure, and, further, to provide a frame wherein the use of tie-wires is entirely avoided.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claim.

In the accompanying drawings which are to be taken as a part of this specification, and in which I have shown a merely preferred form of embodiment of the invention:

The figure is a view in perspective of a frame constructed in accordance with the provisions of this invention.

Referring to the drawing, the reference numeral 1 denotes generally a frame formed of four wires indicated at 2, 3, 4 and 5, said frame being held together by brace wires 6, 7, 8, 9 and 10. The end brace wires 6 and 10 extending completely around the ends of the wires; said frame being elongated and rectangular in cross-section. The reference numeral 11 denotes another elongated frame formed by the wires 12, 13, 14 and 15. This frame is also provided with brace wires indicated at 16, 17, 18 and 19. Frame 11 is extended through frame 1 so as to form a conventional cross. The wires of the respective frames where they cross each other are welded together preferably by electrical heat, that is, they are electrically welded together. It will be noted that the adjacent portions of the outlying wires serve as braces for the respective outlying wires of the respective frames.

It will be apparent that in the welding operations the adjacent portions of the parts welded become merged into each other, and in effect become as integral parts of each other so that no possible movement of one relatively to the other may occur.

Each frame constitutes a skeleton box like or trough like structure which in the illustration is substantially rectangular but it is evident that it may be made in various other forms and that they may be assembled in other relations without departing from the spirit of this invention, and therefore, I do not wish to limit myself to the particular construction shown and described.

What I claim is:

A florist's form comprising a pair of frames rectangular in cross section, each frame comprising outline wires and brace wires, one of said frames being disposed within the other and at right angles thereto, the adjacent portions of the outline wires serving as braces for the respective outline wires of the respective frames.

In witness whereof I have hereunto set my hand this 29th day of April, 1921.

JESSE J. WILLIAMS.

Witnesses:
AGNESS G. WILLIAMS,
AGNES SHAW.